US012669934B2

(12) United States Patent
Powelson et al.

(10) Patent No.: US 12,669,934 B2
(45) Date of Patent: Jun. 30, 2026

(54) APPARATUS, SYSTEMS AND METHODS FOR PROVIDING INPUT/OUTPUT (IO) REQUEST REROUTING

(71) Applicant: INTERNATIONAL BUSINESS MACHINES CORPORATION, Armonk, NY (US)

(72) Inventors: Tabor R. Powelson, Poughkeepsie, NY (US); Andrew C. M. Hicks, Highland, NY (US); Ryan Thomas Rawlins, New Paltz, NY (US); Pasquale A. Catalano, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/539,794

(22) Filed: Dec. 14, 2023

(65) Prior Publication Data

US 2025/0199683 A1     Jun. 19, 2025

(51) Int. Cl.
*G06F 3/06* (2006.01)

(52) U.S. Cl.
CPC ............ *G06F 3/061* (2013.01); *G06F 3/0635* (2013.01); *G06F 3/0679* (2013.01)

(58) Field of Classification Search
CPC ....... G06F 3/061; G06F 3/0635; G06F 3/0679
See application file for complete search history.

(56) References Cited

U.S. PATENT DOCUMENTS

| | | | |
|---|---|---|---|
| 7,769,023 B2 * | 8/2010 | Parthasarathy ....... | H04L 67/563 |
| | | | 370/395.3 |
| 8,356,147 B2 | 1/2013 | Kawaguchi | |
| 9,294,304 B2 | 3/2016 | Sindhu | |
| 10,491,675 B2 | 11/2019 | Elko et al. | |
| 2006/0117172 A1 * | 6/2006 | Zhang ................... | G06F 9/4416 |
| | | | 713/2 |
| 2014/0258256 A1 * | 9/2014 | Dee ......................... | G06F 9/547 |
| | | | 707/705 |
| 2018/0300245 A1 * | 10/2018 | Xu ....................... | G06F 12/0897 |
| 2019/0386889 A1 * | 12/2019 | Noorshams ............. | H04L 47/83 |
| 2021/0081312 A1 * | 3/2021 | Coury ................. | G06F 12/0891 |
| 2021/0326270 A1 * | 10/2021 | Zou ........................ | G06F 3/0604 |
| 2021/0400112 A1 * | 12/2021 | Sorenson, III ........ | G06F 16/183 |
| 2022/0334744 A1 * | 10/2022 | Liu ........................ | G06F 3/0635 |

FOREIGN PATENT DOCUMENTS

WO        2007090754 A1        8/2007

* cited by examiner

*Primary Examiner* — Nanci N Wong
(74) *Attorney, Agent, or Firm* — Onyx IP Group

(57) ABSTRACT

Methods, apparatus and systems receive an IO reroute request for a first system to reroute an IO request with a target storage device that is disconnected from the first system and provides proxy communication of the IO request with the target storage device on behalf of the first system based on the received IO reroute request, using at least a second system that is connected to the same target storage device.

20 Claims, 8 Drawing Sheets

100

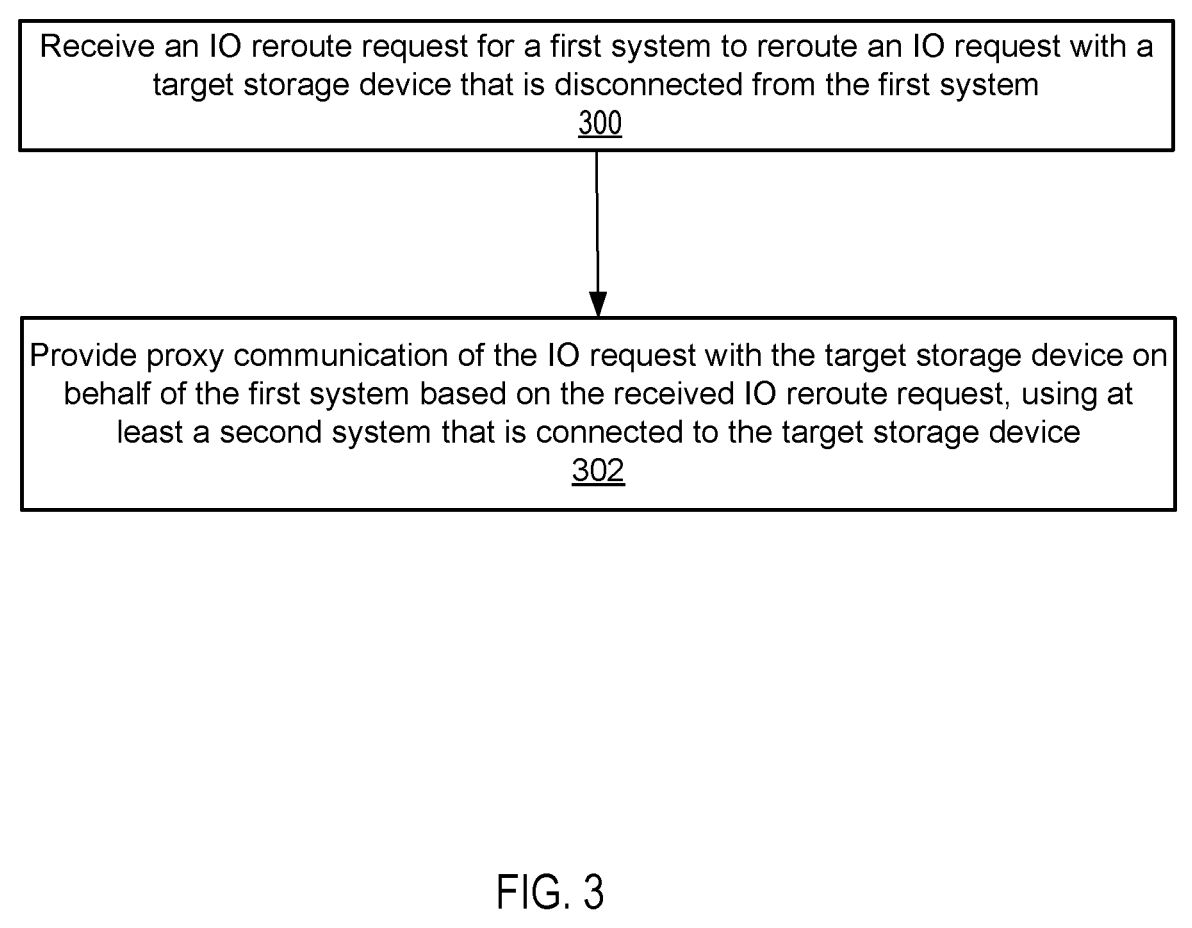

Receive an IO reroute request for a first system to reroute an IO request with a target storage device that is disconnected from the first system
300

Provide proxy communication of the IO request with the target storage device on behalf of the first system based on the received IO reroute request, using at least a second system that is connected to the target storage device
302

FIG. 3

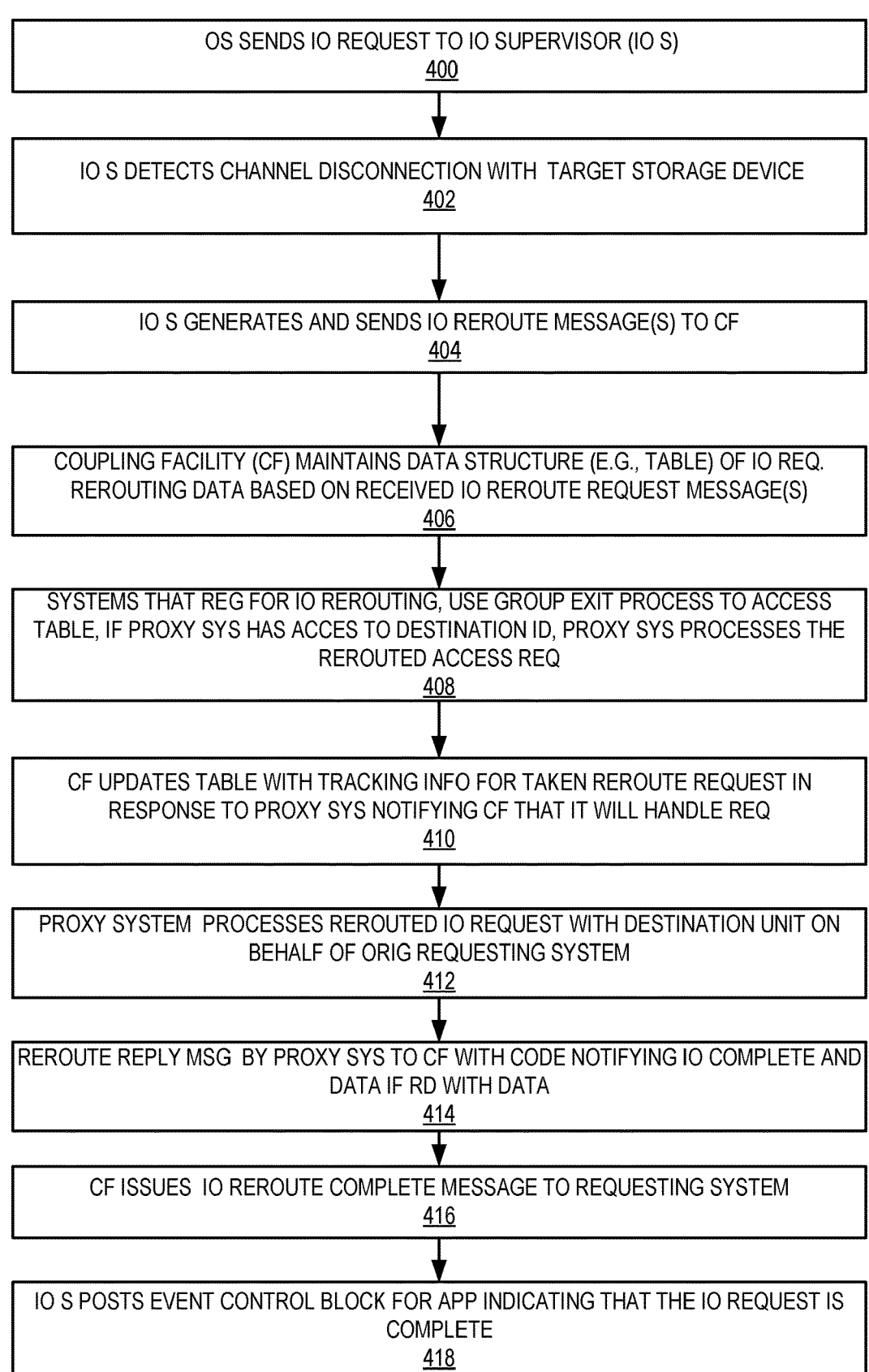

OS SENDS IO REQUEST TO IO SUPERVISOR (IO S)
400

IO S DETECTS CHANNEL DISCONNECTION WITH TARGET STORAGE DEVICE
402

IO S GENERATES AND SENDS IO REROUTE MESSAGE(S) TO CF
404

COUPLING FACILITY (CF) MAINTAINS DATA STRUCTURE (E.G., TABLE) OF IO REQ. REROUTING DATA BASED ON RECEIVED IO REROUTE REQUEST MESSAGE(S)
406

SYSTEMS THAT REG FOR IO REROUTING, USE GROUP EXIT PROCESS TO ACCESS TABLE, IF PROXY SYS HAS ACCES TO DESTINATION ID, PROXY SYS PROCESSES THE REROUTED ACCESS REQ
408

CF UPDATES TABLE WITH TRACKING INFO FOR TAKEN REROUTE REQUEST IN RESPONSE TO PROXY SYS NOTIFYING CF THAT IT WILL HANDLE REQ
410

PROXY SYSTEM PROCESSES REROUTED IO REQUEST WITH DESTINATION UNIT ON BEHALF OF ORIG REQUESTING SYSTEM
412

REROUTE REPLY MSG BY PROXY SYS TO CF WITH CODE NOTIFYING IO COMPLETE AND DATA IF RD WITH DATA
414

CF ISSUES IO REROUTE COMPLETE MESSAGE TO REQUESTING SYSTEM
416

IO S POSTS EVENT CONTROL BLOCK FOR APP INDICATING THAT THE IO REQUEST IS COMPLETE
418

FIG. 4

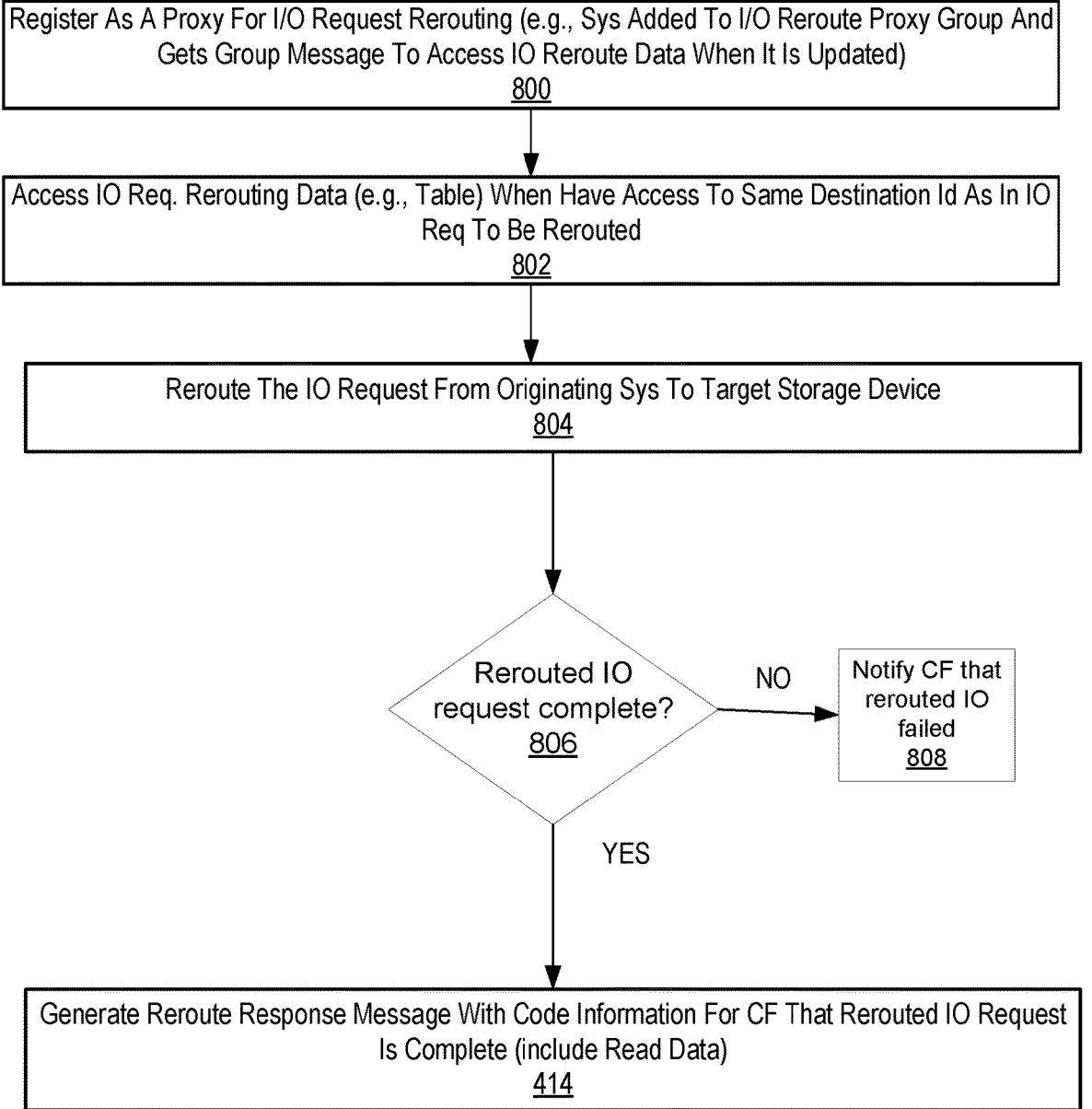

Register As A Proxy For I/O Request Rerouting (e.g., Sys Added To I/O Reroute Proxy Group And Gets Group Message To Access IO Reroute Data When It Is Updated)
800

Access IO Req. Rerouting Data (e.g., Table) When Have Access To Same Destination Id As In IO Req To Be Rerouted
802

Reroute The IO Request From Originating Sys To Target Storage Device
804

Rerouted IO request complete?
806

NO

Notify CF that rerouted IO failed
808

YES

Generate Reroute Response Message With Code Information For CF That Rerouted IO Request Is Complete (include Read Data)
414

FIG. 8

APPARATUS, SYSTEMS AND METHODS FOR PROVIDING INPUT/OUTPUT (IO) REQUEST REROUTING

BACKGROUND

The present disclosure relates to methods, apparatus, and products for handling input/output (IO) requests, such as data requests from computing systems in a clustered computing environment, to remote storage devices.

SUMMARY

According to embodiments of the present disclosure, various methods, apparatus and products for rerouting of input/output (IO) requests, such as data access requests from computing systems in a clustered computing environment, to remote storage devices are described herein. In some aspects, methods, apparatus and systems reroute IO requests from a first system to a second system when the first system detects a channel disconnection with a target storage device. The second system also has channel connections to the same target storage device and serves as a proxy system for the first system and services IO requests that are rerouted from the first system that are destined for the same target storage device. For example, in some aspects, methods, apparatus and systems receive an IO reroute request for a first system to reroute an IO request with a target storage device that is disconnected from the first system and provides proxy communication of the IO request with the target storage device on behalf of the first system based on the received IO reroute request, using at least a second system that is connected to the same target storage device.

BRIEF DESCRIPTION OF THE DRAWINGS

FIG. 3 sets forth a flowchart of an example process for rerouting IO requests according to aspects of the present disclosure.

FIG. 4 sets forth a more detailed flowchart of an example process for rerouting IO requests according to aspects of the present disclosure.

FIG. 8 sets forth a flowchart of an example process for a second system that serves as a proxy system according to aspects of the present disclosure.

DETAILED DESCRIPTION

Clustered processing systems, such as for example, parallel sysplex clustering using IBM Z™ allows a set of up 32 or more IBM z/OS systems to be connected and to behave as a single, logical computing platform. Parallel sysplex operation enables enterprises to run multiple copies of z/OS® as a single image, so multiple systems and resources can be managed from a single point of control. For example, in a parallel sysplex environment, operating systems can span multiple systems and share their applications and data, to scale out across the capacity of many z/OS images. A coupling facility is a piece of hardware that provides locking, caching, and list services between coupling-capable z/OS® processors in a parallel sysplex. Coupling-facility links connect a coupling facility to the coupling-capable processors. Typically, the coupling-facility has its own operating system, referred to as Coupling Facility Control Code (CFCC) that provides the coupling-facility functions. Generally, a coupling facility runs in a logical partition (LPAR). The LPAR can use shared or dedicated coupling processors (CPS). The LPAR has IO capabilities. In some systems, coupling facility links are used to send requests in and out of the coupling facility, however, typically the coupling facility has no access to disk, such as remote storage devices. Operators can issue commands to the CFCC. In some systems, they do so through the secure IBM Z Hardware Management Console (HMC) interfaces.

If a system in a sysplex does not have a direct connection to a device such as a remote storage device (e.g. tape, direct-access storage device (DASD), etc.) through channels such as via Fibre Channels through a network interface, it is unable to perform IO operations to the device. This affects availability to a device if the channels forming the physical path between a system and a device are disconnected or become inaccessible from one system in a sysplex either through in a virtual environment or non-virtual environment. For example, users of clustered processing systems often run testing on new software code in virtual environments that may try to access remote storage devices through IO data access requests, referred to also as IO requests. As used herein an IO request can also include control information for the target device. However, there may be channel outages to the remote storage device and therefore a system that normally has a direct connection to a remote storage device does not have a connection. The testing operation fails or is prevented from functioning. Also, in non-test environments channel outages can provide costly disruptions for a clustered processing system by denying needed access to data from the remote storage devices.

Figure 1:
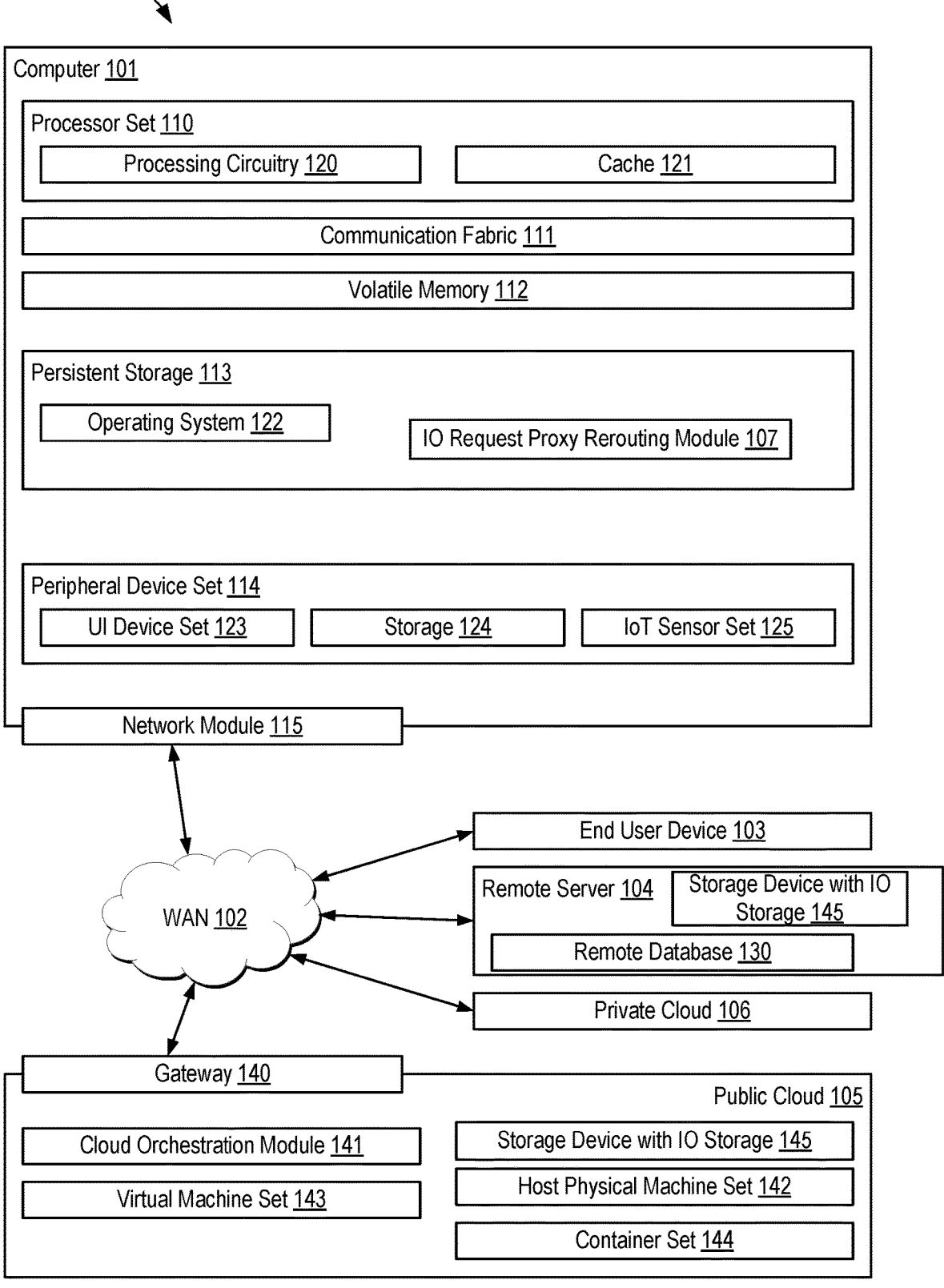
FIG. 1 sets forth an example computing environment according to aspects of the present disclosure.

With reference now to FIG. 1, FIG. 1 sets forth an example computing environment according to aspects of the present disclosure. Computing environment 100 contains an example of an environment for the execution of at least some of the computer code involved in performing the various methods described herein, such as IO request proxy rerouting code shown as block 107. In addition to block 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to provide a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in block 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104. The remote server includes a storage device 145 with IO storage such as a hard disk drive with cache or other suitable remote storage device that serves as a target storage device, also referred to as a destination device, for the computer 101.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102. The public cloud 105 may also include a storage device 145 with IO storage such as a hard disk drive with cache or other suitable remote storage device that serves as a target storage device, also referred to as a destination device, for the computer 101.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
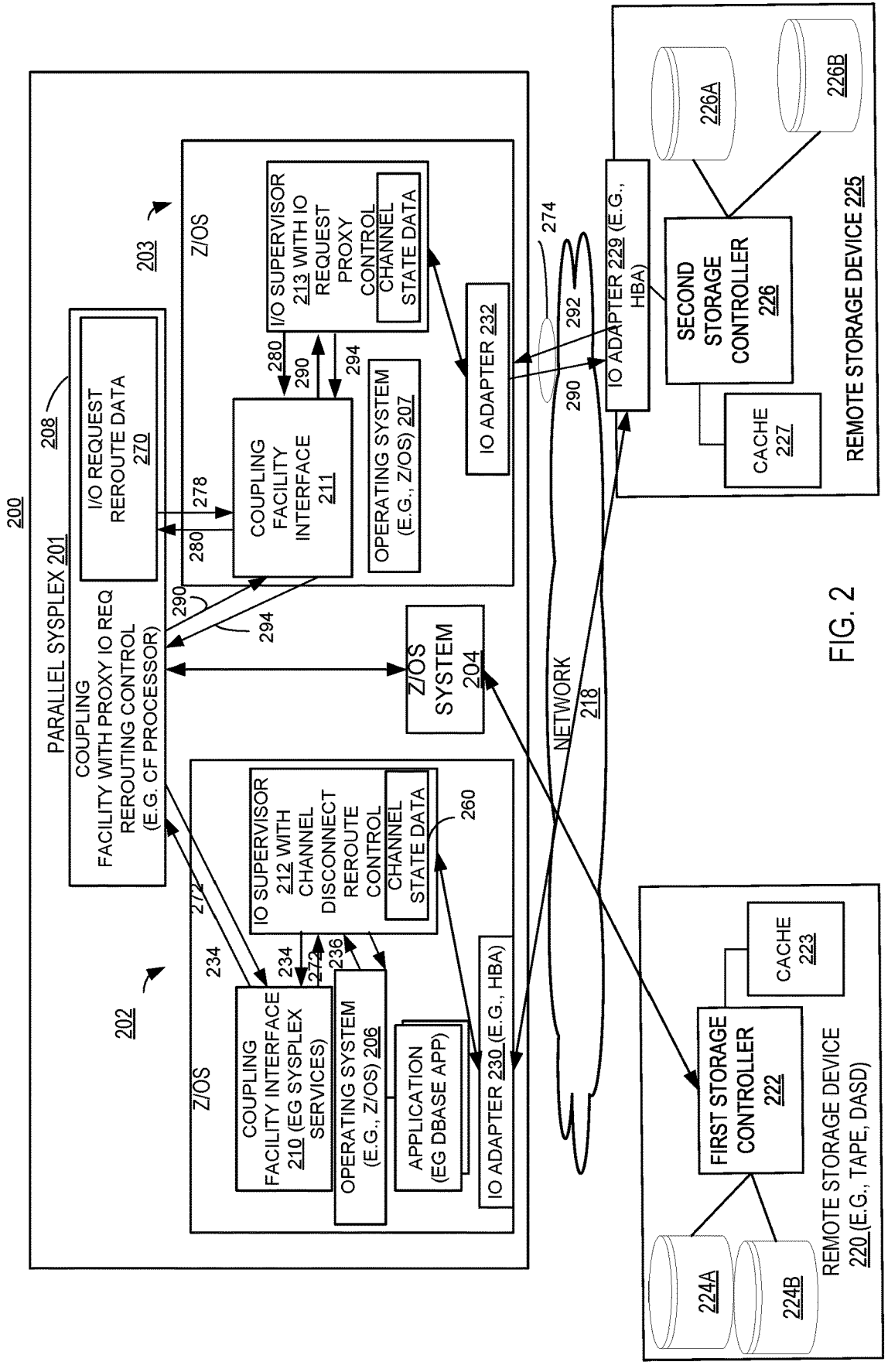
FIG. 2 sets forth another example computing environment according to aspects of the present disclosure.

FIG. 2 sets forth an example computing environment 200 according to aspects of the present disclosure. In this example, the computing environment 200 includes an IBM parallel sysplex 201, however any suitable computing system that employs IO requests for remote storage devices may be employed. In this example, the parallel sysplex includes computing systems 202, 203 and 204, each such as an IBM Z® mainframe or computer system 101, and a coupling facility 208 that communicates with the computing systems 202-204 via communication links. However, any suitable computing system may be employed. The parallel sysplex 201 is a collection of z/OS systems, such as a first system 202 and a second system 203 that cooperate, using certain hardware and software products, to process work. For example, each of the systems 202-204 in this example include a computer 101 and each operating under an instance of an OS shown as z/OS operating system 206 and 207 respectively (operating system images). However, the systems can be on the same computer 101 using differing processor sets or a same processor set. In this example, each z/OS operating system image is in a same security domain and the coupling facility 208, in this example is a hardware device with one or more coupling facility processors, memory (RAM, ROM) similar to computer 101 and an operating system. The coupling facility 208 is programmed with new proxy IO request rerouting control as further described below. It will be recognized that the proxy IO request rerouting control may be placed in any suitable components including in one or more of the systems or as a standalone product.

The systems 202-204 within the parallel sysplex 201 use IO requests to retrieve and store data to remote storage devices 220 and 225. Remote storage devices 220 and 225 each include respective storage controllers 222, 226 that process IO requests to read and store data into their respective local caches 223 and 227 and/or persistent memory 224A, 224B and 226A and 226B respectively. In this example, both systems 202 and 203 are connected to the same remote storage device 225 and system 204 is connected to a different remote storage device 220. For example, when the operating systems 206 and 207 want to read or write data to a storage device outside the mainframe such as the remote persistent storage device 225, the operating systems issue IO requests via a Fibre Channel (or other types of channels), that include transport control words or channel command words, that are sent over physical channels through respective host network interfaces, such as an IO adapter shown as a host bus adapter 230 and 232, through a network 218 to the remote storage device 225. The remote storage device 225 has a corresponding network interface such as an IO adapter shown as a host bus adapter 229. Similarly, system 204 accesses the remote storage device 220 through different channels. In this example, the system 202 will be described as the originating system that originates an IO request for a target storage device, namely remote storage device 225 and the system 203 will be described as the proxy system that communicates the IO request originated by system 202 to be provided to the same target storage device, namely remote storage device 225.

Generally, the remote storage devices 220 and 225, such as hard disk drives and other persistent storage devices have their own caches 223 and 227 (also referred to as IO cache) as part of the device. In some systems, the transport control word (e.g., IO request) includes data representing a requestor identifier for the system that is making the request, an operation type (e.g., read or write), a target device identifier, one or more addresses to be read or written (or a pointer to an address), and status information for the request. The remote storage device processes the received IO requests and performs the designated operation type (read or write of data to or from the address) using the IO cache when the requested data is in the cache or from the persistent storage location when there is a cache miss. The remotes storage device updates the status information and sends a response back to the requesting host device with the read data for a read operation or a confirmation that the data was written.

System 202 includes stored executable code that executes on one or more processing devices in the form of the operating system 206, a coupling facility interface 210, an IO supervisor 212 and one or more applications. In some embodiments, the IO supervisor 212 is included as part of the Operating System 206. In this example, the operating system 206 issues IO requests to read and/or write data to the target remote storage device 225 using a channel provided by the IO adapter 230. However, when a channel is disconnected, the OS is not able to read or write data with the remote storage device 225 and the IO request is instead rerouted to the system 203 that also has physical channels to connect with the same target storage device. In this example, the IO supervisor 212 has channel disconnect reroute control in addition to other standard controls. In this example, system 203 includes an IO supervisor 213 that includes IO request proxy control that facilitates the system 203 serving as an IO request proxy to the remote storage device 225 for other systems, such as system 202. It will be recognized that the system 202 in some implementations also includes the IO request proxy control so that it can serve as a proxy for other systems. Similarly in some implementations the system 203 also includes the channel disconnect reroute control so that other systems may serve as a proxy for system 203. Each system can register with the coupling facility 208 to serve as a proxy for other systems. The coupling facility interfaces 210 and 211 include sysplex services that can be called by the respective IO supervisors to receive and send information to the coupling facility.

Referring also to FIG. 3, FIG. 3 sets forth a flowchart of an example process for rerouting IO requests according to aspects of the present disclosure. It will be recognized that the operations may be performed in any suitable order and by any suitable component. In this example, the operations are performed by the coupling facility 208. As shown in block 300, the method includes receiving an input/output (IO) reroute request 234, also referred to as an IO request reroute message, to reroute an IO request 236 for the first system 202 with the target remote storage device 225. The target remote storage device 225 is disconnected from the system 202 through the physical IO adapter channels so that the system 202 does not have a communication path to the target remote storage device 225 through the physical network interface connection. The disconnected status may be set for example if there are no logical paths available from the operating system 206 to the target remote storage device 225. As shown in block 302, the method includes providing proxy communication of the IO request 236 with the target remote storage device 225 on behalf of the system 202 based on the received IO reroute request 234, using the system 203 that is connected to the target remote storage device 225. In this example, system 203 serves a proxy system for communicating IO requests from the system 202 to the same target remote storage device 225. The system 203 is running another instance of the OS 207, just like the OS 206 used in the system 202.

Referring to FIG. 2 and FIG. 4 a more detailed example of IO request rerouting will be described. FIG. 4 sets forth a more detailed flowchart of an example process for rerouting IO requests for system 202. In this example, as shown in block 400 the operating system 206 or other requestor sends the IO request 236 to the IO supervisor 212. In this example the IO request 236 includes data representing a destination identifier for the target storage device such as a worldwide node name, address information in the target device and one or more operation commands such as read or write commands for the target device. As shown in block 402 the method includes in response to the IO request 236 from the operating system or other requestor, detecting a channel disconnection of the first system with the target storage device. For example, the IO supervisor 212 has access to channel state data 260 that is provided by the IO adapter 230 indicating the state of the channels provided by the IO adapter. Where a channel state indicates that a channel is connected to the target remote storage device 225 through IO adapter 229, the IO request is sent through a normal pathway flow through the IO adapter 230. However, where the channel state data shows that the channel for the IO request is disconnected, the method includes as shown in block 404 generating and sending the IO reroute request 234 to the coupling facility 208.

The coupling facility 208 provides, in response to the IO reroute request 234, a data structure, such as a table, database entry, or other data structure in a peer address space that is accessible by systems in the parallel sysplex, or any other suitable structure that contains IO request rerouting data 270 for the proxy system 203. In this example, the IO request rerouting data 270 includes data from the IO reroute request 234 such as the destination identifier for the target storage device, the address of the target device and the operation command and the identifier of the originating system and tracking data. Additional discussion of the messages and IO request reroute data 270 is provided in connection with FIG. 5 below. The coupling facility, as shown in block 406, maintains the data structure, such as a table, of IO request rerouting data for each IO request that is being rerouted by one or more systems in the sysplex based on received IO reroute requests and updates the table to add data for new IO requests to be rerouted and to update tracking data for IO requests that are being rerouted.

As shown in block 408, in some implementations, systems in the sysplex register with the coupling facility to be proxies for other systems in the sysplex. Those that are registered are given access to the table through, for example, a peer address space that each registered system accesses 278 to see if they are connected to a target storage device that matches with a destination identifier in the table. In other implementations, all systems are automatically enrolled. When a match is found by a registered proxy system, the system sends a tracking notification 280 to notify the coupling facility that a particular IO request identified by the data in the table is being handled by the proxy system (rerouted) and the coupling facility packages the IO request data from the table into a rerouted IO request 290 for the proxy system 203, such as by sending a function code with the rerouted IO request notifying the proxy system to use a rerouting process for this IO request. In another example, the proxy system pulls the IO request data directly from the table and creates the reroute IO request. In one example, a group exit process is used to access the table by the proxy system. In the group exit example, each system 202 and 203 registers with the coupling facility 208 that they are members of a Cross-systems Coupling Facility (XCF) group for the IO Reroute Control Function. Each system 202 and 203 initially sends a signal to the coupling facility 208 with the list of remote storage devices they have access to, which the coupling facility then propagates to all systems 202 and 203. When a given system 202 or 203 gains or loses access to a given storage device, the system updates its user status for the IO Reroute Control Function within the coupling facility 208. The coupling facility 208 propagates the updated user status to all systems 202 and 203.

As shown in block 410, the coupling facility 208 updates the table with tracking information such as one or more status bits for the IO request that is taken in response to the proxy system notifying the coupling facility that it will handle a particular IO request to be rerouted. As shown in block 412, the method includes the proxy system 203 processing the rerouted IO request with the remote storage device 225 on behalf of the originating requesting system 202. For example, the rerouted IO request 290 is sent to the remote storage device 225 through channel 274 that connects the same remote storage device 225. When the rerouted IO request 290 is completed, information from the completed IO request response 292 is provided to the coupling facility by IO supervisor 213 as part of a reroute reply message 294 that includes a message code (also referred to as a function code) indicating that the rerouted IO request is completed including read data if the request was to read data, and the coupling facility 208 updates the table with tracking data indicating that the IO request in the table has been serviced or removes the corresponding data from the table.

As shown in block 416 the coupling facility 208 issues an IO reroute complete message 272 to the system 202 that requested rerouting of the IO request. For example, the coupling facility 208 issues an IO reroute complete message 272 for the first system in response to the second system 203 completing access with the target remote storage device 225 through a channel 274 associated with the second system. For example, the coupling facility uses a new message code with corresponding information associated with the IO reroute request 234, such that the IO supervisor 212, receives the corresponding response back from the IO reroute request that it issued. As shown in block 418 the method includes the IO supervisor 212 posting an event control block for the application or operating system indicating that the IO request is complete along with read data from the target remote storage device 225 if the request was for a read operation.

Figure 5:
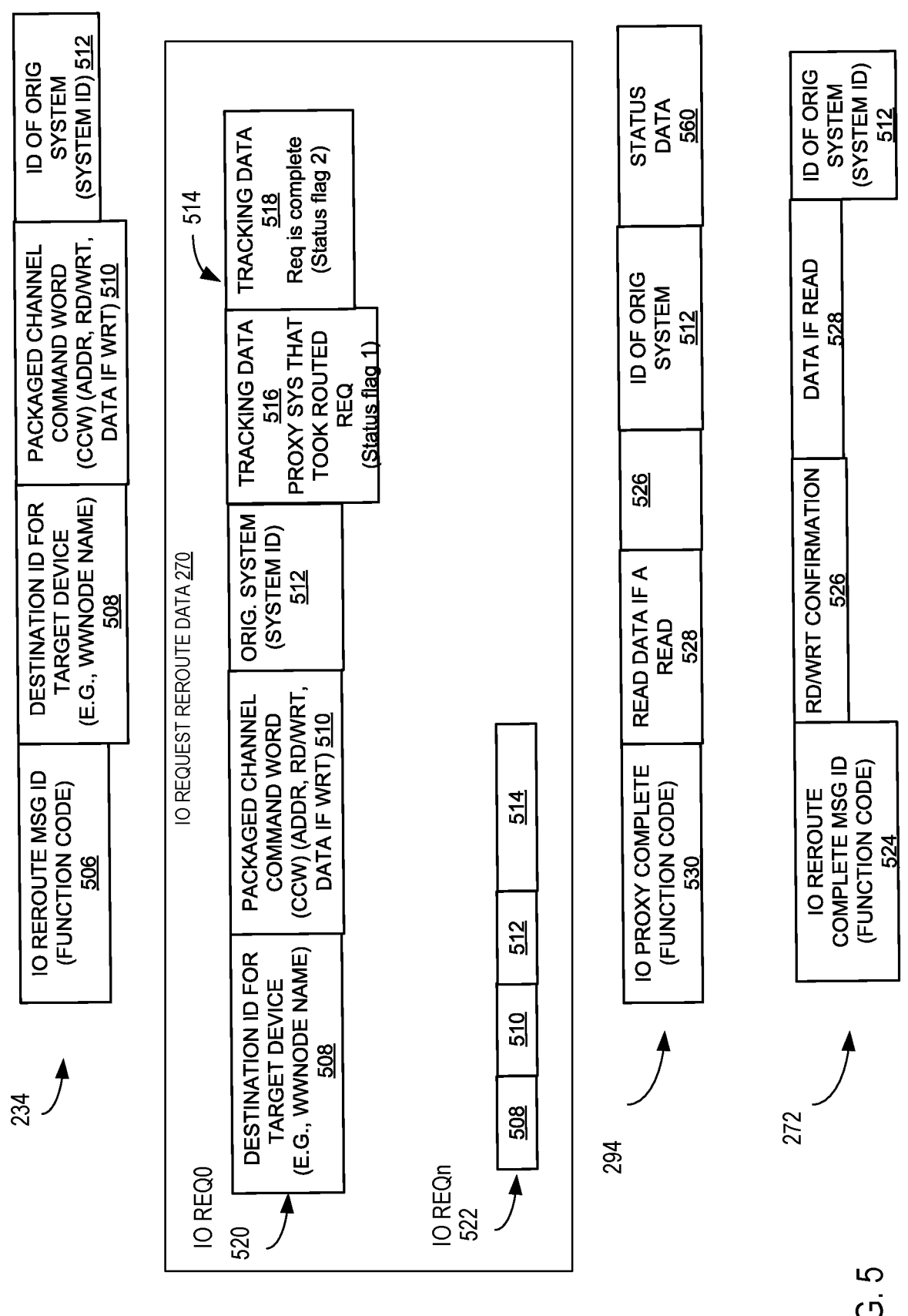
FIG. 5 sets forth an example diagram of messages and information associated with an IO request proxy rerouting module according to aspects of the present disclosure.

Referring also to FIG. 5, FIG. 5 sets forth an example diagram of messages and information associated with an IO request proxy rerouting module according to aspects of the present disclosure. In this example, the IO supervisor 212 generates the IO reroute request 234 to include data representing the IO reroute message identifier 506, the destination identifier 508 from the IO request 236, the address information and corresponding operation command information 510 from the IO request, in the form of a channel command word, and an identifier 512 of the originating system, such as a system identifier for system 202. Any other suitable data may also be employed as desired.

The coupling facility 208 provides, in response to the IO reroute request 234, IO request rerouting data 270 for the proxy system 203 that includes data representing a destination identifier 508 for the target storage device, a read or a write operation 510 for the target storage device, and an originating system identifier 512 for the originating system 202. In this example the coupling facility 208 provides, a destination identifier 508 from the IO reroute request 234, the address and operation command information 510, the originating system identifier 512 from the IO reroute request 234. In this example, the coupling facility 208 stores for each IO request to be rerouted, tracking data 514 such as data 516 that tracks when the second system has agreed to act as a proxy system for the first system and data 518 that tracks when the second system has completed rerouting of the IO request with the target storage device on behalf of the first system. In one example, requests include a channel command word for information 510, that contains a channel command, such as read, write, or control, along with the data address of the data area involved. Each channel command word specifies a command to be executed and, for data transfer commands, the source or destination area.

In some implementations, the IO request rerouting data 270 is stored for each IO reroute request 234, shown as IO Request 0 520 through IO Request n 522 from all systems in the sysplex. The coupling facility 208 provides the IO request rerouting data 270 as an accessible data structure, such as records, a table or other structure in peer address space, that is accessible to the second system and other systems in the sysplex where systems pull information from the data structure. The coupling facility 208 updates the data structure based on messages from the original system and from the proxy system. In some implementations the IO reroute data 270 is broadcast to systems in a registered group when a new IO reroute request is received from any system.

The IO request rerouting data is updated, such as a table being updated with a new entry, when a new IO reroute request is received from a system. In certain implementations, system 204 or other system stores and maintains the IO request rerouting data 270 and the coupling facility instead serves as a router to route requests to be rerouted to another system that has the IO request rerouting data. In some implementations, channel to channel communications among systems is used instead of using a coupling facility.

Referring back to FIGS. 4-5, the coupling facility generates the IO reroute complete message 272 for the requesting system, in this case for the IO supervisor, to include data representing an IO reroute complete message identifier 524, read and/or write confirmation data, read data 528 if the IO request 236 was for a read operation, and the identifier 512 of the originating system. The proxy system in this example, IO supervisor 213 in system 203, generates the IO proxy complete message 294 as a reply to the rerouting the IO request 290, to include data representing an IO proxy complete code 530, read and/or write confirmation 526, read data 528 if the IO request 236 was for a read operation and the identifier 512 of the originating system. The originating system lets the CF know which original system to send the response 272 to using an identifier of the originating system.

Figure 6:
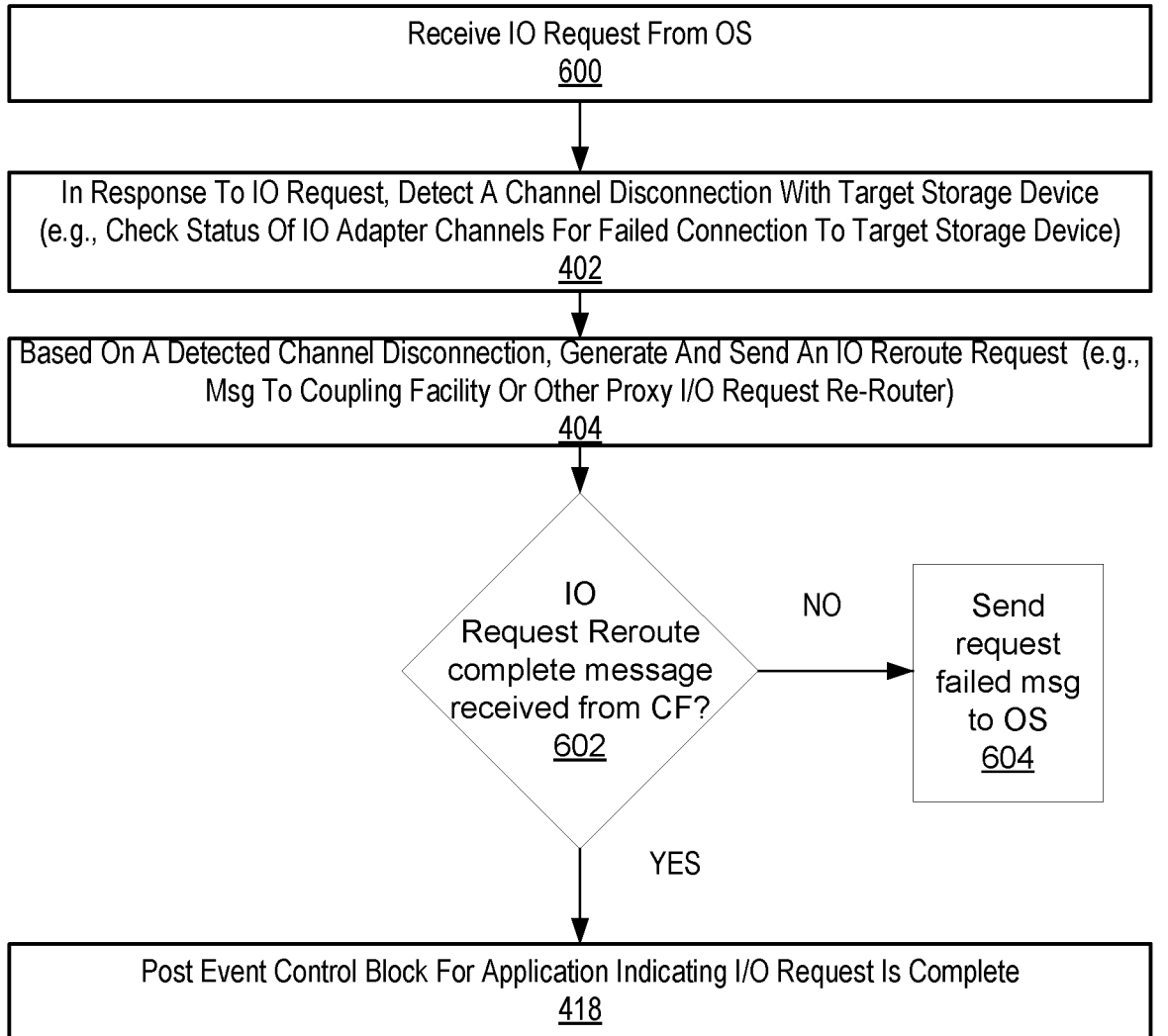
FIG. 6 sets forth a flowchart of an example process for a first system that originates an IO request according to aspects of the present disclosure.

Referring also to FIG. 6, FIG. 6 sets forth a flowchart of an example process for a first system that originates an IO request. As shown in block 600 the IO supervisor 212 receives an IO request 236 from the operating system 206 or other requestor. In response to the IO request, the IO supervisor 212 detects whether there is a channel disconnection for the channel designated to send to the IO request from the first system to the target storage device as noted above with respect to block 402. In response to a detected channel disconnection for the IO request, the IO supervisor generates the IO reroute request 234, as noted above with respect to block 404.

In this example, to generate the IO reroute request 234, an IO reroute request generator 501 in the IO supervisor 212 creates a message in a format that is understood by the coupling facility 208. In this example, a new function code is used, such as IO reroute message identifier 506, to designate to the coupling facility that an IO reroute operation has been designated for the IO request. In this example, the IO supervisor generates the IO reroute request 234 to include data representing the IO reroute message identifier 506, the destination identifier 508 from the IO request 236, the address information and operation command information 510 from the IO request, in the form of a channel command word, and an identifier 512 of the originating system, such as a system identifier for system 202. Any other suitable data may also be employed as desired.

From the perspective of system 202, the IO supervisor waits for a response to the IO reroute request 234. As shown in block 600 the method includes detecting when a corresponding IO reroute complete message 272 has been received from the IO request rerouting control 502 in the coupling facility. Detection is based on the originating system identifier 512 in the IO reroute complete message 272 matching the originating system identifier 512 in the IO reroute request 234. However, when a system sends multiple IO request to be rerouted, each IO request is assigned a request ID to track each request if desired. The IO reroute complete message 272 in some implementations includes status information indicating whether the IO request was successfully carried out by the proxy system, based on the tracking data in the table. As shown in block 604, when the IO reroute complete message 272 indicates a failure, the IO supervisor posts an event block for the application or operating system indicating that the IO request reroute operation failed. For successful reroutes, as noted above for block 418, the IO supervisor 212, posting an event control block for the application or operating system indicating that the IO request is complete along with read data from the target remote storage device 225 if the request was for a read operation.

Figure 7:
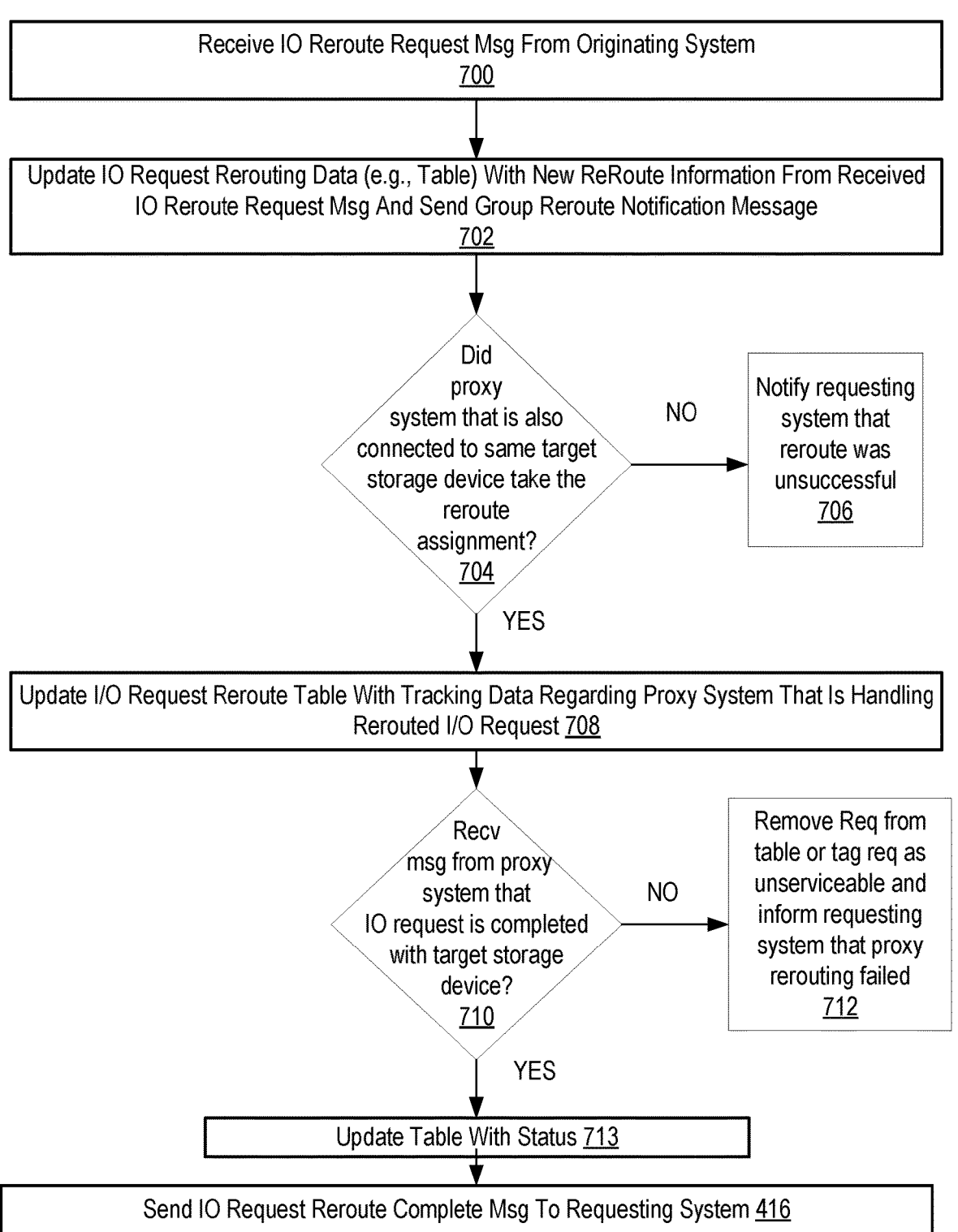
FIG. 7 sets forth a flowchart of an example process for IO request rerouting according to aspects of the present disclosure.

Referring also to FIG. 7, FIG. 7 sets forth a flowchart of an example process for IO request rerouting according to aspects of the present disclosure. The method in this example is performed by one or more processing units in the coupling facility but it will be recognized that the operation can be carried out by another system or other suitable component. As shown in block 700, the method includes receiving, by the coupling facility, the IO reroute request 234 from system 202. As shown in block 702 the method includes updating the IO request rerouting data 270, such as updating a table, with new reroute information from a received IO reroute request and send group reroute notification message to the group of systems that registered to be proxy systems. For example, the coupling facility updates group information for the IO Reroute Control Function to trigger the Cross-systems Coupling Facility (XCF) group exit to be driven on each potential proxy system. The XCF Group Exit getting control on a given system alerts it that the IO Reroute request is outstanding, which prompts that system to attempt to read the request. As shown in block 704, the method includes determining if a proxy system has agreed to take the IO request. For example, a proxy system that is also connected to the same target storage device sends a notification 280 to the coupling facility that the proxy system is handling the IO request that is in the table. The coupling facility updates the status data for that IO request indicating which system is handling the IO request. And shown in block 706 when the coupling facility does not receive any indication from a proxy system, such as after a time out period, the coupling facility sends an IO request reroute complete message 272 that indicates that the message did not reroute successfully. However, as shown in block 708 when a proxy system acknowledges that it has taken the IO request listed in the table, the coupling facility updates the IO request reroute table with tracking data to include the associated proxy system identifier that is handling the rerouted IO request. As shown in block 710, the coupling facility receives a message, such as message 294 indicating that the IO request that was rerouted, has completed with the storage device. As shown in block 712 if the message is not received, the coupling facility informs the requesting system that the proxy rerouting failed and if desired removes the pending IO request from the reroute table or tags the reroute request as unrouteable. As shown in block 713, if the message is received, the coupling facility updates the table tracking data with data indicating that the IO request has been completed. As shown in block 416 as previously noted above, the coupling facility sends the IO request reroute complete message 272 to the requesting system.

Referring also to FIG. 8, FIG. 8 sets forth a flowchart of an example process for a second system that serves as a proxy system according to aspects of the present disclosure. As shown in block 800, the method includes registering with the coupling facility as a proxy system for IO request rerouting. Registration occurs for example through a user interface with an administrator identifying certain systems as being systems to use for rerouting. The coupling facility and registered systems to an IO reroute group and in some implementations issues group messages when new IO requests are received from systems that request rerouting. In response to the group message each proxy system checks the table to see if they are connected to a target device that is in the table. If so, a respective proxy system informs the coupling facility that will reroute a particular IO request.

As shown in block 802, the method includes accessing, by the second system, the IO request rerouting data 270 in response to the second system having a channel connected with a target storage device identified by the destination identifier. The request rerouting data 270 is accessed on the proxy system 203 through the coupling facility interface 211 reading the data from the coupling facility 208. As shown in block 804, the method includes rerouting the IO request, by the second system for the first system, to the target storage device. For example, the IO supervisor 213, if needed, reformats the rerouted IO request 290 into an IO request understood by the target remote storage device 225 including for example changing the originating system identifier from system 202 to system 203 and uses channel 274 to send the request. As shown in block 806 if the returned response 292 from the target storage unit is successful, the IO supervisor 213 generates the message 294 (see FIG. 5) for the coupling facility indicating that the rerouted IO request has been completed. The message 294 includes making the originating system identifier reflect the identifier for system 202 (identifier 512 identifies system 202). When the response 292 is returned indicting a failure, the message 294 is returned with status data 560 indicating a failure to reroute as shown in block 808. The failure is logged in the table and the message 272 indicates that the reroute attempt failed.

Among other technical benefits, using other systems as proxy systems that are connected to a same target storage device as a system whose connection has failed, provides improved system performance when processing IO requests.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory provided the data is not transitory while it is stored. Operations described in the flowcharts herein are performed by circuitry such as one or more processing devices that execute stored instructions in one or more program products, and/or other suitable circuits including application specific integrated circuits, state machines, programmable field gate arrays or any suitable structure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a coupling facility included in a computing cluster that includes a plurality of systems, an input/output (IO) reroute request for a first system of the plurality of systems to reroute an IO request with a target storage device that is disconnected from the first system,
      wherein a second system, of the plurality of systems, is connected to the target storage device, and
      wherein the first system and the second system register with the coupling facility to serve as proxies for the plurality of systems; and
   providing, by the coupling facility, proxy communication of the IO request with the target storage device on behalf of the first system based on the received IO reroute request, using at least the second system,
      wherein the proxy communication is provided based on the first system and the second system registering to serve as proxies for the plurality of systems.

2. The method of claim 1, comprising:
   in response to the IO request, detecting a channel disconnection of the first system with the target storage device;
   generating the IO reroute request based on the IO request, in response to the detected channel disconnection; and
   sending the IO reroute request.

3. The method of claim 1, wherein providing proxy communication comprises:
   providing, in response to the IO reroute request, IO request rerouting data for the second system that includes data representing a destination identifier for the target storage device; and further comprising issuing an IO reroute complete message for the first system in response to the second system completing access with the target storage device through a channel associated with the second system.

4. The method of claim 1, comprising:

tracking when the second system has agreed to act as a proxy system for the first system and tracking when the second system has completed rerouting of the IO request with the target storage device on behalf of the first system.

5. The method of claim 3, comprising:

providing the IO request rerouting data as an accessible data structure to the second system when the IO request rerouting data is updated.

6. The method of claim 5, comprising:

for the IO reroute request, providing the accessible data structure with data representing a destination identifier for the target storage device, a read or a write operation for the target storage device, and an originating system identifier for the first system.

7. The method of claim 5, comprising:

accessing, by the second system, the IO request rerouting data in response to the second system having a channel connected with a target storage device identified by the destination identifier;

rerouting the IO request, by the second system as a proxy system for the first system, to the target storage device; and generating a message for a coupling facility indicating that the rerouted IO request has been completed.

8. A system comprising:

a first system, in a computing cluster that includes a plurality of systems, executing a first instance of an operating system;

a second system, in the computing cluster, executing a second instance of the operating system; and a coupling facility, in the computing cluster, operatively coupled to at least the first system and the second system, the coupling facility configured to:

receive an input/output (IO) reroute request for the first system to reroute an IO request with a target storage device that is disconnected from the first system, wherein the first system and the second system register with the coupling facility to serve as proxies for the plurality of systems; and provide proxy communication of the IO request with the target storage device on behalf of the first system based on the received IO reroute request, using at least the second system that is connected to the target storage device, wherein the proxy communication is provided based on the first system and the second system registering to serve as proxies for the plurality of systems.

9. The system of claim 8, wherein the coupling facility is configured to route the IO request to the second system providing the second system to send the IO request to the target storage device on behalf of the first system, wherein the coupling facility is included within a logical partition (LPAR).

10. The system of claim 8, wherein the first system is configured to:

in response to an IO data access request, detect a channel disconnection with the target storage device;

generate the IO reroute request based on the IO data access request, in response to the detected channel disconnection; and send the IO reroute request to the coupling facility.

11. The system of claim 8, wherein the coupling facility is configured to:

provide proxy communication by providing, in response to the IO reroute request, IO request rerouting data for the second system that includes data representing a destination identifier for the target storage device; and issue an IO reroute complete message for the first system in response to the second system completing access with the target storage device through a channel associated with the second system.

12. The system of claim 8, wherein the coupling facility is configured to:

provide the IO request rerouting data as an accessible data structure to the second system and wherein the IO request rerouting data comprises data representing a destination identifier for the target storage device, a read or a write operation for the target storage device, and an originating system identifier for the first system.

13. The system of claim 12, wherein the second system is configured to:

access the IO request rerouting data in response to having a channel connected with a target storage device identified by the destination identifier;

reroute the IO request to the target storage device using the channel; and generate a message for the coupling facility indicating that the rerouted IO request has completed.

14. The system of claim 8, comprising the first system and the second system operating as a parallel sysplex.

15. An apparatus comprising:

a processing device in a computing cluster that includes a plurality of systems; and memory operatively coupled to the processing device, wherein the memory stores computer program instructions that, when executed, provide the processing device to:

receive an input/output (IO) reroute request for a first system of the plurality of systems to reroute an IO request with a target storage device that is disconnected from the first system, wherein a second system, of the plurality of systems, is connected to the target storage device, and wherein the first system and the second system register with the coupling facility to serve as proxies for the plurality of systems; and provide proxy communication of the IO request with the target storage device on behalf of the first system based on the received IO reroute request, using at least the second system, wherein the proxy communication is provided based on the first system and the second system registering to serve as proxies for the plurality of systems.

16. The apparatus of claim 15 wherein the memory stores computer program instructions that, when executed, provide the processing device to:

in response to an IO data access request, detect a channel disconnection of the first system with the target storage device;

generate an IO request reroute message based on the IO data access request, in response to the detected channel disconnection; and send the IO request reroute message as the request.

17. The apparatus of claim 15 wherein the memory stores computer program instructions that, when executed, provide the processing device to:

provide IO request rerouting data for the second system that includes data representing a destination identifier for the target storage device; and issuing an IO reroute complete message for the first system in response to the second system completing access with the target storage device through a channel associated with the second system.

18. The apparatus of claim 15 wherein the memory stores computer program instructions that, when executed, provide the processing device to track when the second system has agreed to act as a proxy system for the first system and to track when the second system has completed rerouting of the IO request with the target storage device on behalf of the first system.

19. The apparatus of claim 17 wherein the memory stores computer program instructions that, when executed, provide the processing device to serve as a coupling facility that is operatively couplable to the first system and to the second system and provides the IO request rerouting data as an accessible data structure to the second system and provides a notification for the second system when the IO request rerouting data is updated.

20. The apparatus of claim 19 wherein the memory stores computer program instructions that, when executed, provide the processing device to provide the accessible data structure comprising data representing a destination identifier for the target storage device, a read or a write operation for the target storage device, and an originating system identifier for the first system.

* * * * *